US012617344B2

(12) United States Patent
Brady et al.

(10) Patent No.: US 12,617,344 B2
(45) Date of Patent: May 5, 2026

(54) VEHICLE REMOVABLE JUMP SEAT

(71) Applicant: FCA US LLC, Auburn Hills, MI (US)

(72) Inventors: Brandon F Brady, Lapeer, MI (US);
Benjamin T Treinen, Birmingham, MI
(US); Everard J Scott, Sterling
Heights, MI (US); Scott C Waller,
Brighton, MI (US); Ryan C Nagode,
West Bloomfield, MI (US); **Todd
McKinzie**, Goodrich, MI (US)

(73) Assignee: FCA US LLC, Auburn Hills, MI (US)

( * ) Notice: Subject to any disclaimer, the term of this
patent is extended or adjusted under 35
U.S.C. 154(b) by 174 days.

(21) Appl. No.: 18/539,636

(22) Filed: Dec. 14, 2023

(65) Prior Publication Data

US 2024/0217404 A1     Jul. 4, 2024

Related U.S. Application Data

(60) Provisional application No. 63/478,374, filed on Jan.
4, 2023.

(51) Int. Cl.
| | |
|---|---|
| *B60N 2/30* | (2006.01) |
| *B60K 26/02* | (2006.01) |
| *B60N 2/015* | (2006.01) |
| *B60N 2/64* | (2006.01) |
| *B60N 2/68* | (2006.01) |
| *B60N 2/90* | (2018.01) |
| *B60N 3/10* | (2006.01) |
| *B60R 7/04* | (2006.01) |
| *B60R 11/00* | (2006.01) |

(52) U.S. Cl.
CPC ................ *B60N 2/30* (2013.01); *B60K 26/02*
(2013.01); *B60N 2/015* (2013.01); *B60N 2/64*
(2013.01); *B60N 2/68* (2013.01); *B60N 2/90*
(2018.02); *B60N 3/102* (2013.01); *B60R 7/04*
(2013.01); *B60R 7/043* (2013.01); *B60R
2011/008* (2013.01)

(58) Field of Classification Search
CPC ... B60N 2/30; B60N 2/90; B60N 2/64; B60N
2/68; B60N 3/102; B60K 26/02; B60R
7/04; B60R 7/043; B60R 2011/008
See application file for complete search history.

(56) References Cited

U.S. PATENT DOCUMENTS

| | | | | |
|---|---|---|---|---|
| 4,527,828 A | | 7/1985 | Groce et al. | |
| 5,029,928 A | * | 7/1991 | Huber ..................... | B60P 3/423 |
| | | | | 297/452.41 |
| 5,516,179 A | * | 5/1996 | Tidwell .............. | B62D 33/0612 |
| | | | | 296/64 |
| 5,533,219 A | | 7/1996 | Meyers | |

(Continued)

*Primary Examiner* — Philip F Gabler
(74) *Attorney, Agent, or Firm* — Jeremy J. Klobucar

(57) ABSTRACT

A jump seat configured to be attached to and detached from
a rear wall of a passenger cabin of a vehicle. The jump seat
includes a frame configured to be attached to and detached
from the rear wall of the passenger cabin; a seat back
attached to the frame; a seat pivotably attached to the frame
such that the jump seat is configured to move between a
deployed position where the seat is configured to support an
occupant and a non-deployed position where the seat is
oriented in parallel with the seat back; and a detachment
mechanism attached to the frame and configured to be
actuated to detach the jump seat from the rear wall of the
passenger cabin.

9 Claims, 12 Drawing Sheets

(56)                  References Cited

U.S. PATENT DOCUMENTS

| 5,707,103 | A  * | 1/1998 | Balk | ................... B60N 2/3052 297/378.12 |
| 5,791,729 | A  * | 8/1998 | McCormick | ............. A47C 9/06 297/14 |
| 6,345,856 | B1 | 2/2002 | Minai | |
| 6,460,922 | B1 * | 10/2002 | Demick | ............... B60N 2/3068 297/14 |
| 6,948,778 | B1 * | 9/2005 | Jaradat | ............... B60N 2/01516 297/440.1 |
| 7,270,371 | B2 * | 9/2007 | Adragna | .............. B60N 2/3093 296/65.09 |
| 7,559,594 | B2 * | 7/2009 | McMillen | .............. B60N 2/832 297/14 |
| 7,774,880 | B1 | 8/2010 | Botts | |
| 7,980,614 | B2 * | 7/2011 | Denton | ..................... B60R 7/04 296/37.16 |
| 8,757,711 | B2 * | 6/2014 | Bertocchi | ................ B60N 2/30 297/283.1 |
| 9,308,836 | B2 * | 4/2016 | Hausler | ................ B60N 2/3031 |
| 9,517,710 | B2 * | 12/2016 | Correia | .................. B60N 2/005 |
| 10,144,315 | B2 * | 12/2018 | Michalak | .................. B60N 2/02 |
| 10,179,524 | B1 * | 1/2019 | Caye | ...................... B60N 2/366 |
| 10,543,923 | B2 * | 1/2020 | Pacheco | ............. B64D 11/0691 |
| 2012/0199695 | A1 | 8/2012 | Isherwood et al. | |
| 2025/0058684 | A1 * | 2/2025 | Bonk | ................. B60N 2/01591 |

* cited by examiner

VEHICLE REMOVABLE JUMP SEAT

CROSS-REFERENCE TO RELATED APPLICATIONS

This application claims the benefit of U.S. Provisional Application No. 63/478,374, filed on Jan. 4, 2023. The entire disclosure of the above application is incorporated herein by reference.

FIELD

The present application relates to a vehicle removable jump seat.

BACKGROUND

This section provides background information related to the present disclosure which is not necessarily prior art.

Vehicles are becoming increasingly versatile due to customers requiring that the vehicle have sufficient passenger space as well as sufficient storage. The desire to have sufficient passenger space and sufficient storage, however, are often at odds with each other. In this regard, without increasing a size of the vehicle, it can be difficult to provide increased passenger space without sacrificing increased storage and vice versa. Thus, there is a need for a vehicle that can provide sufficient space for passengers without sacrificing sufficient storage space.

SUMMARY

This section provides a general summary of the disclosure, and is not a comprehensive disclosure of its full scope or all of its features.

According to a first aspect of the present disclosure, there is provided a vehicle that includes a vehicle body defining a passenger cabin having at least one row of passenger seats, and a storage region located between the at least one row of seats and a rear wall of the passenger cabin; and at least one jump seat, wherein the at least one jump seat includes a frame configured to be attached to and detached from the rear wall of the passenger cabin; a seat back attached to the frame; a seat pivotably attached to the frame such that the jump seat is configured to move between a deployed position where the seat is configured to support a passenger of the vehicle and a non-deployed position where the seat is oriented in parallel with the rear wall of the passenger cabin; and a detachment mechanism attached to the frame and configured to be actuated to detach the at least one jump seat from the rear wall of the passenger cabin.

According to the first aspect, the seat includes an upper surface that is configured to support the passenger when the jump seat is in the deployed position and a bottom surface, wherein the bottom surface includes a pair of multi-function arms pivotably attached thereto.

According to the first aspect, each of the multi-function arms includes a proximate end pivotably attached to the bottom surface and a distal end that defines a hook, and each the multi-function arms is movable between a first position where the distal end that defines the hook of each of the multi-function arms is positioned adjacent to the bottom surface and a second position where the distal end that defines the hook of each of the multi-function arms is located distal to the bottom surface.

According to the first aspect, each of the multi-function arms includes a curved section between the proximate end and the distal end that defines a clearance between the bottom surface and the distal end that defines the hook when each of the multi-function arms are in the second position, wherein the clearance is configured for receipt of a member to which the at least one jump seat may be attached when the at least one jump seat is detached from the rear wall of the passenger cabin.

According to the first aspect, the rear wall of the passenger cabin includes an upper section having a cushioned seat back, and the cushioned seat back is located above the seat back of the jump seat when the jump seat is attached to the rear wall of the passenger cabin.

According to the first aspect, the rear wall includes a lower section positioned beneath the upper section that includes at least one recess configured for receipt of the frame such that the at least one jump seat nests with the recess when attached to the rear wall of the passenger cabin.

According to the first aspect, the detachment mechanism includes a lever including a proximate end pivotably attached to the frame and a distal end defining a latching device that mates with an aperture formed in the rear wall.

According to the first aspect, the frame defines a graspable handle, and the detachment mechanism is located proximate the graspable handle.

According to the first aspect, the graspable handle includes an opening that exposes a manipulation section of the lever, and enables the manipulation section to be contacted to actuate the lever.

According to a second aspect of the present disclosure, there is provided a jump seat configured to be attached to and detached from a rear wall of a passenger cabin of a vehicle. The jump seat includes a frame configured to be attached to and detached from the rear wall of the passenger cabin; a seat back attached to the frame; a seat pivotably attached to the frame such that the jump seat is configured to move between a deployed position where the seat is configured to support an occupant and a non-deployed position where the seat is oriented in parallel with the seat back; and a detachment mechanism attached to the frame and configured to be actuated to detach the at least one jump seat from the rear wall of the passenger cabin.

According to the second aspect, the seat includes an upper surface that is configured to support the occupant when the jump seat is in the deployed position and a bottom surface, the bottom surface includes a pair of multi-function arms pivotably attached thereto.

According to the second aspect, each of the multi-function arms includes a proximate end pivotably attached to the bottom surface and a distal end that defines a hook, and each the multi-function arms is movable between a first position where the distal end that defines the hook of each of the multi-function arms is positioned adjacent to the bottom surface and a second position where the distal end that defines the hook of each of the multi-function arms is located distal to the bottom surface.

According to the second aspect, each of the multi-function arms includes a curved section between the proximate end and the distal end that defines a clearance between the bottom surface and the distal end that defines the hook when each of the multi-function arms are in the second position, the clearance being configured for receipt of a member to which the jump seat may be attached when the jump seat is detached from the rear wall of the passenger cabin.

According to the second aspect, the detachment mechanism includes a lever including a proximate end pivotably attached to the frame and a distal end defining a latching device that is configured to mate with an aperture formed in the rear wall.

According to the second aspect, the frame defines a graspable handle, and the detachment mechanism is located proximate the graspable handle.

According to the second aspect, the graspable handle includes an opening that exposes a manipulation section of the lever, and enables the manipulation section to be contacted to actuate the lever.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

4

Figure 1:
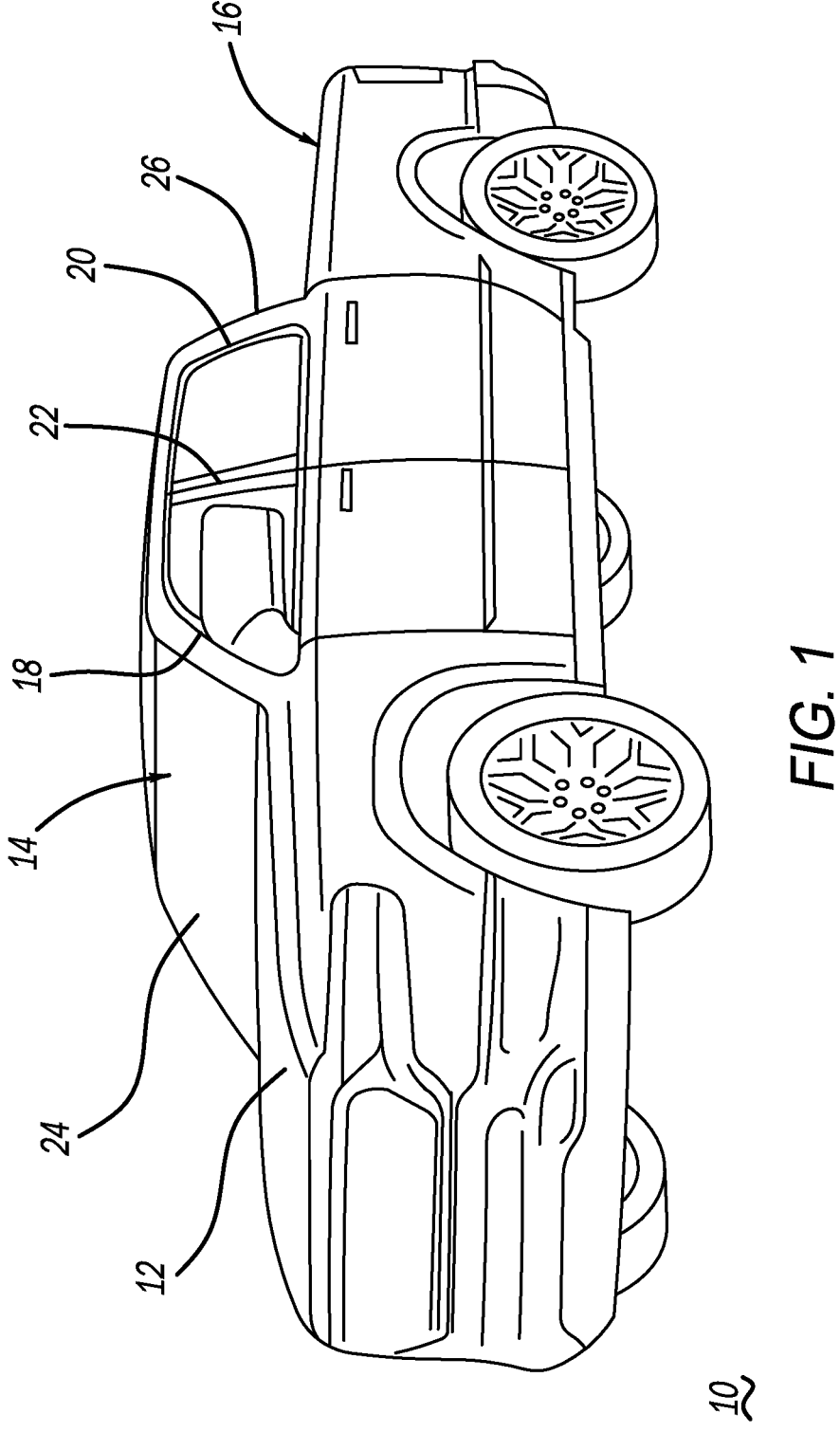
FIG. 1 is a perspective view of a vehicle according to a principle of the present disclosure.

Corresponding reference numerals indicate corresponding parts throughout the several views of the drawings.

DETAILED DESCRIPTION

Example embodiments will now be described more fully with reference to the accompanying drawings. The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 12:
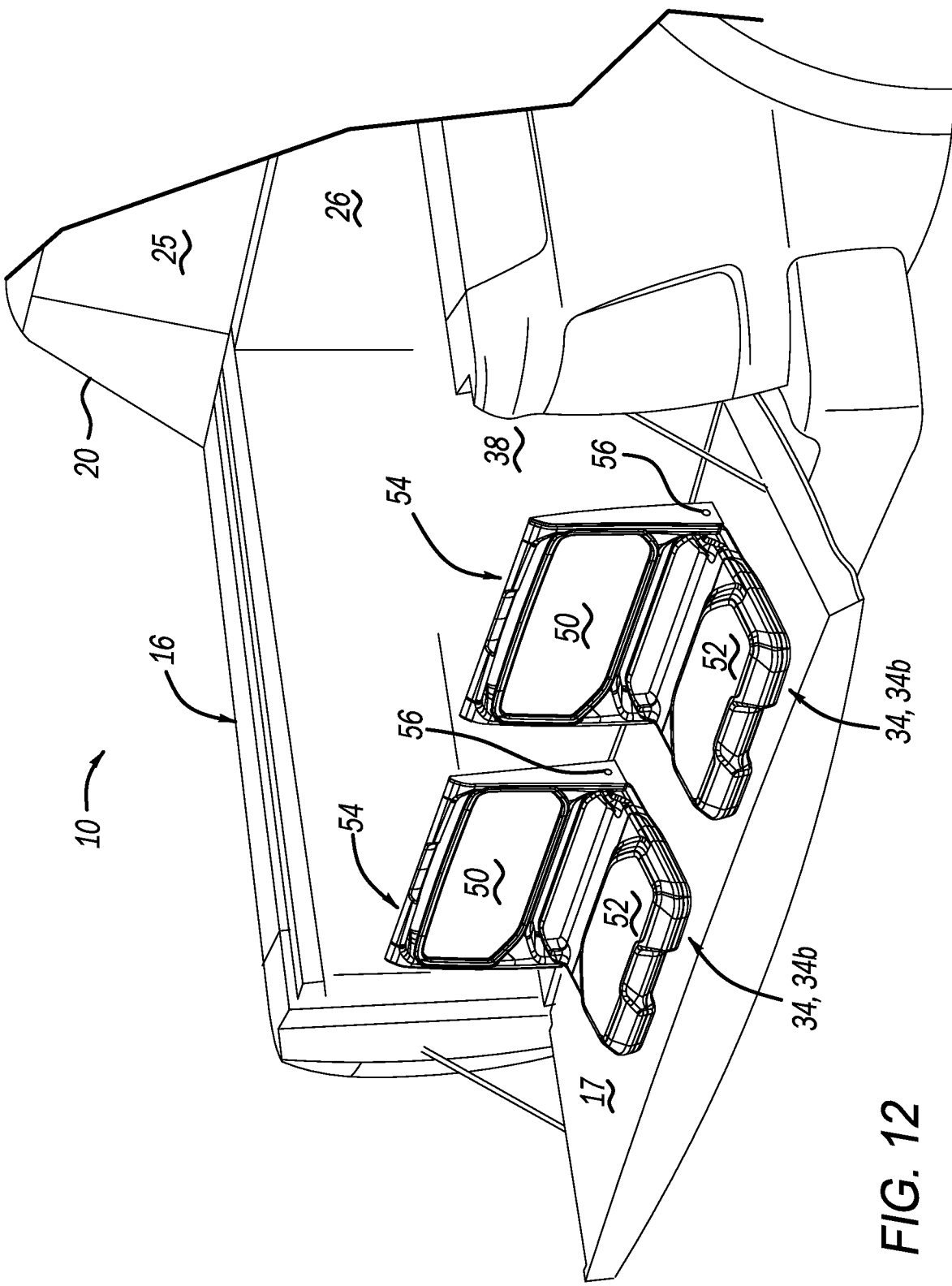
FIG. 12 is a perspective view of a vehicle bed and tailgate supporting a pair of jump seats that have been removed from the rear wall of the cabin of the vehicle.

FIG. 1 illustrates an example vehicle 10 according to a principle of the present disclosure. Vehicle 10 includes a body 12 that, in the illustrated example vehicle, defines a vehicle passenger cabin 14 and storage bed 16 having a tailgate 17 (FIG. 12). Passenger cabin 14, more specifically, is defined as the area located between a pair of A-pillars 18 and a pair of C-pillars 20. An optional pair of B-pillars 22 may be positioned between the A-pillars 18 and the C-pillars 20. A windshield 24 is positioned between the A-pillars 18 and a rear window 25 (FIGS. 3 and 6) is positioned between the C-pillars 20. C-pillars 20 may also support a rear wall 26 of passenger cabin 14.

Figures 2, 3:
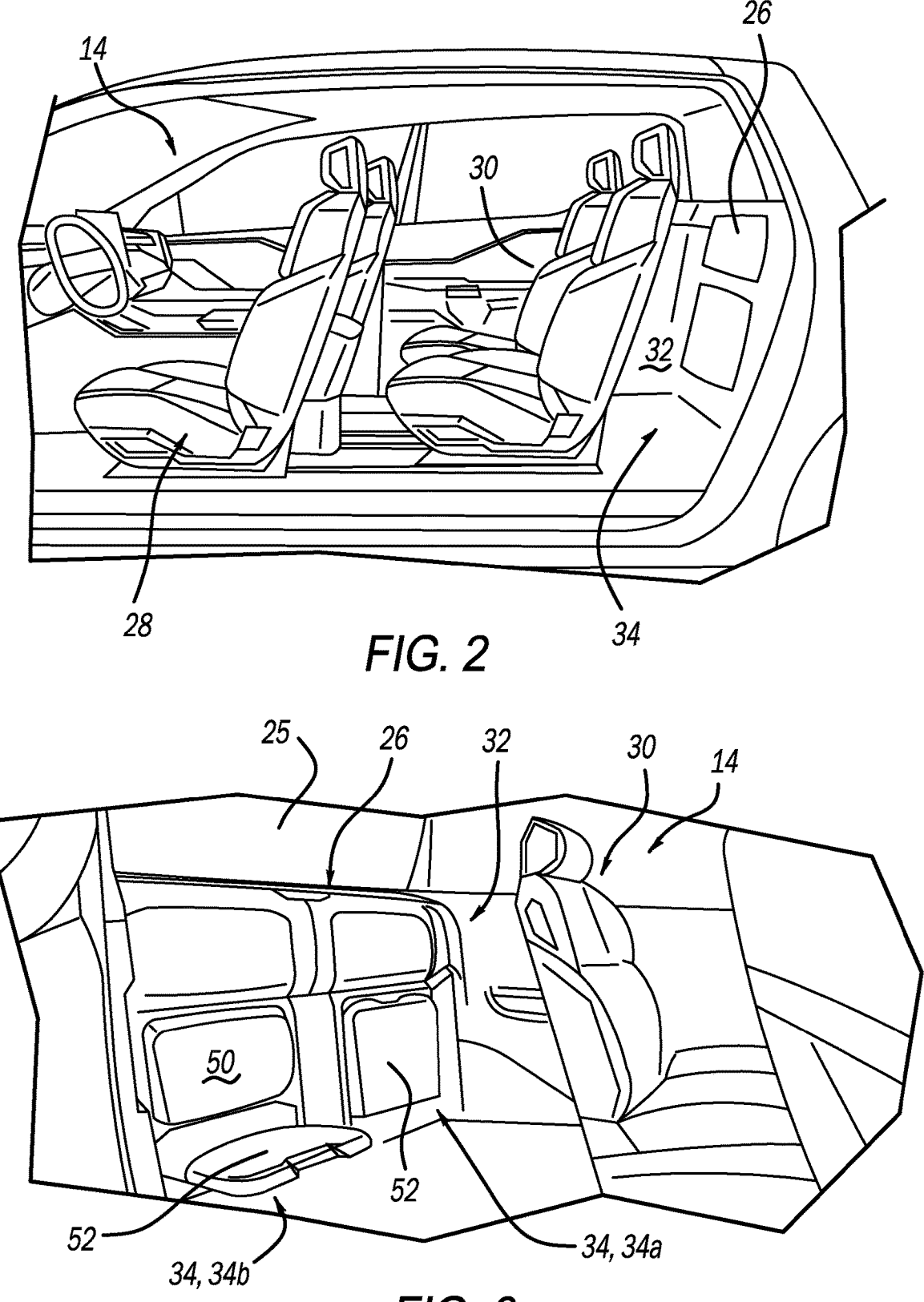
FIG. 2 is a side perspective view of an interior of the vehicle illustrated in FIG. 1 according to a principle of the present disclosure.
FIG. 3 is a perspective view of a pair of removable jump seats according to a principle of the present disclosure within the interior of the vehicle illustrated in FIG. 2, with one of the jump seats being in a deployed position and one of the jump seats being in a non-deployed position according to a principle of the present disclosure.

Now referring to FIGS. 2 and 3, it can be seen that passenger cabin 14 defines an interior of vehicle 10 having a first or front row of passenger seats 28, a second or rear row of passenger seats 30, and a storage region 32 located between the second row of passenger seats 30 and the rear wall 26. According to a principle of the present disclosure, rear wall 26 may include at least one jump seat 34 configured to attached thereto and configured to be removed therefrom, as will be described in more detail later. As best shown in FIG. 3, jump seats 34 may be configured to transition from a non-deployed position 34a and a deployed position 34b. By providing jump seats 34 that are removable in storage region 32, as well as being movable between a non-deployed position 34a to a deployed position 34b, vehicle 10 can be provided with increased passenger space without sacrificing sufficient storage.

Figure 4:
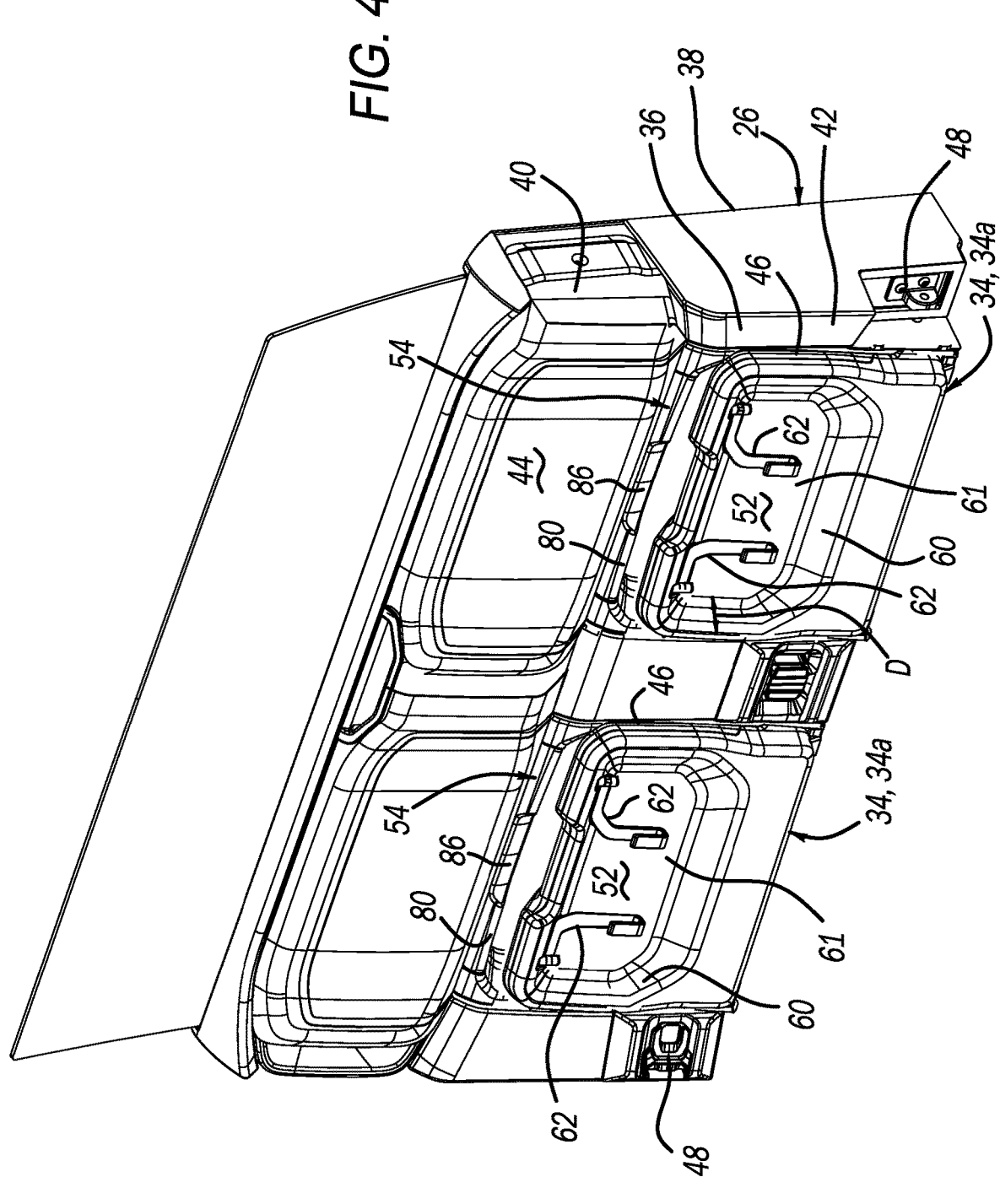
FIG. 4 is a perspective view of a rear wall of the interior shown in FIG. 3 removed from the cabin and having a pair of removable jump seats attached thereto in the non-deployed position according to a principle of the present disclosure.
Figure 5:
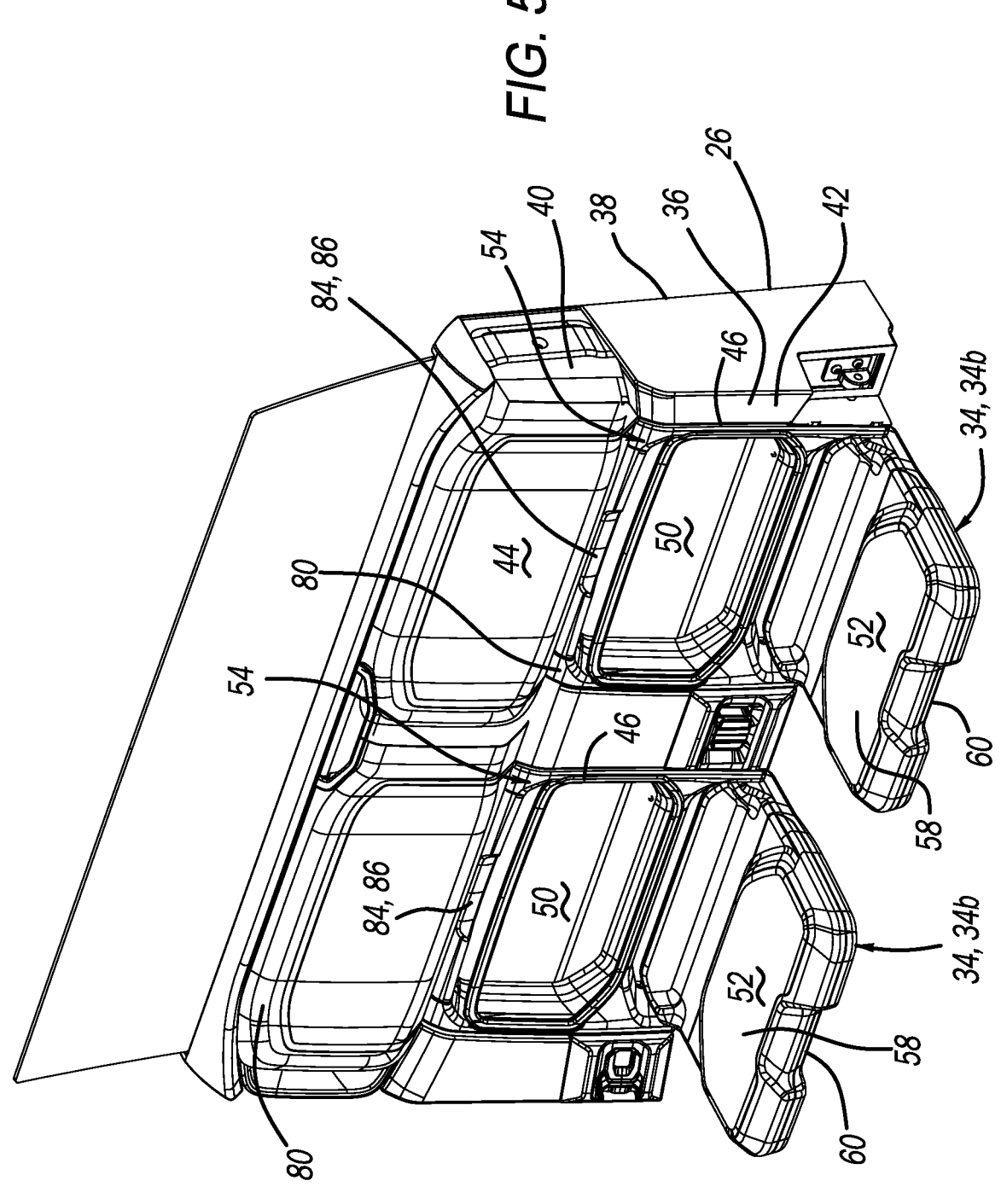
FIG. 5 is a perspective view of a rear wall of the interior shown in FIG. 3 removed from the cabin and having a pair of removable jump seats attached thereto in the deployed position according to a principle of the present disclosure.
Figure 6:
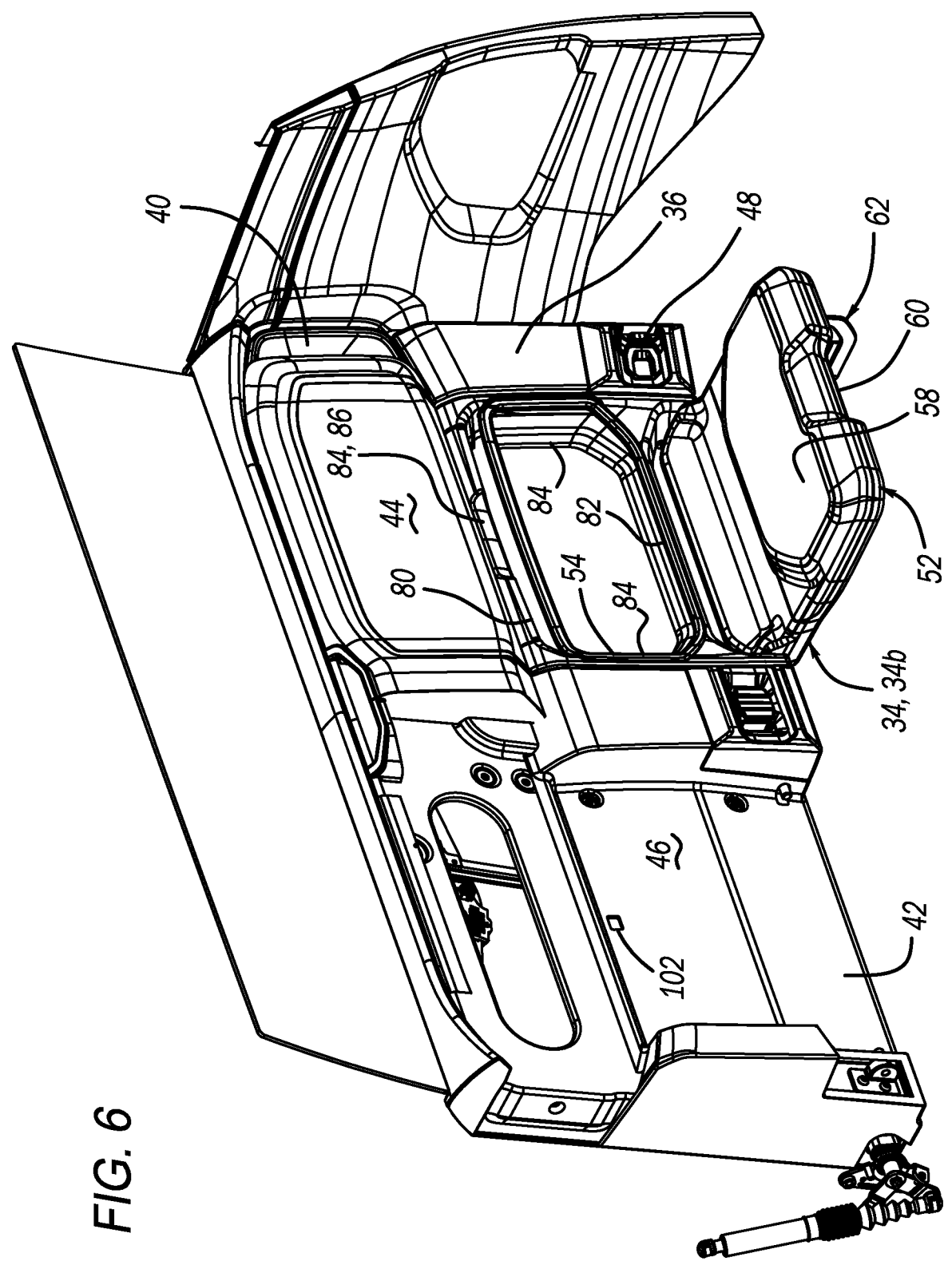
FIG. 6 is a perspective view of the rear wall shown in FIGS. 4 and 5, with one of the jump seats and an upper seat back of the rear wall removed according to a principle of the present disclosure.

Now referring to FIGS. 4-6, jump seats 34 are illustrated as being attached to rear wall 26 in the non-deployed position 34a (FIG. 4) and the deployed position 34b (FIG. 5), respectively. Rear wall 26 includes an interior surface 36 that faces second row of passenger seats 30 and an exterior surface 38 that faces storage bed 16 of vehicle 10. Interior surface 36 includes an upper section 40 and a lower section 42. Upper section 40 may be provided with a cushioned seat back 44 that, when jump seats 34 are in the deployed position 34b, is configured as an upper backrest for a passenger sitting in jump seat 34. While a single cushioned seat back 44 is illustrated as overlapping the pair of jump seats 34, it should be understood that cushioned seat back 44 may be divided into a pair of sections if desired.

Lower section 42 is configured to support jump seats 34 when jump seats 34 are attached thereto. In this regard, lower section 42 includes a pair of recesses 46 (FIG. 6) that are configured for receipt of jump seats 34. Put another way, jump seats 34 are sized and shaped to nest with recesses 46 of lower section 42. Lower section 42 also includes seat belts 48 for use when an occupant in located in a jump seat 34.

Figure 7:
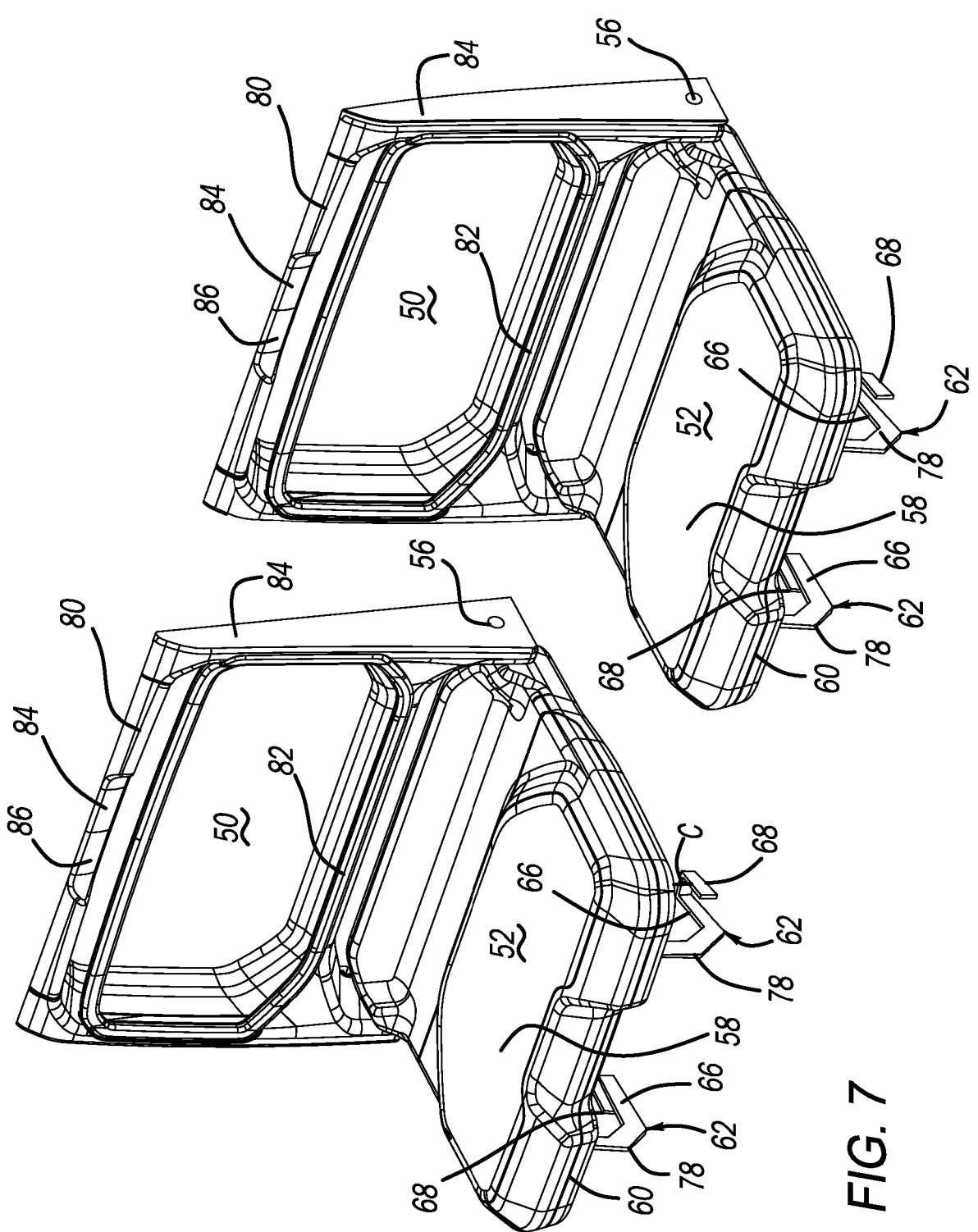
FIG. 7 is a perspective view of a jump seat removed from the rear wall and in a deployed position according to a principle of the present disclosure.
Figure 8:
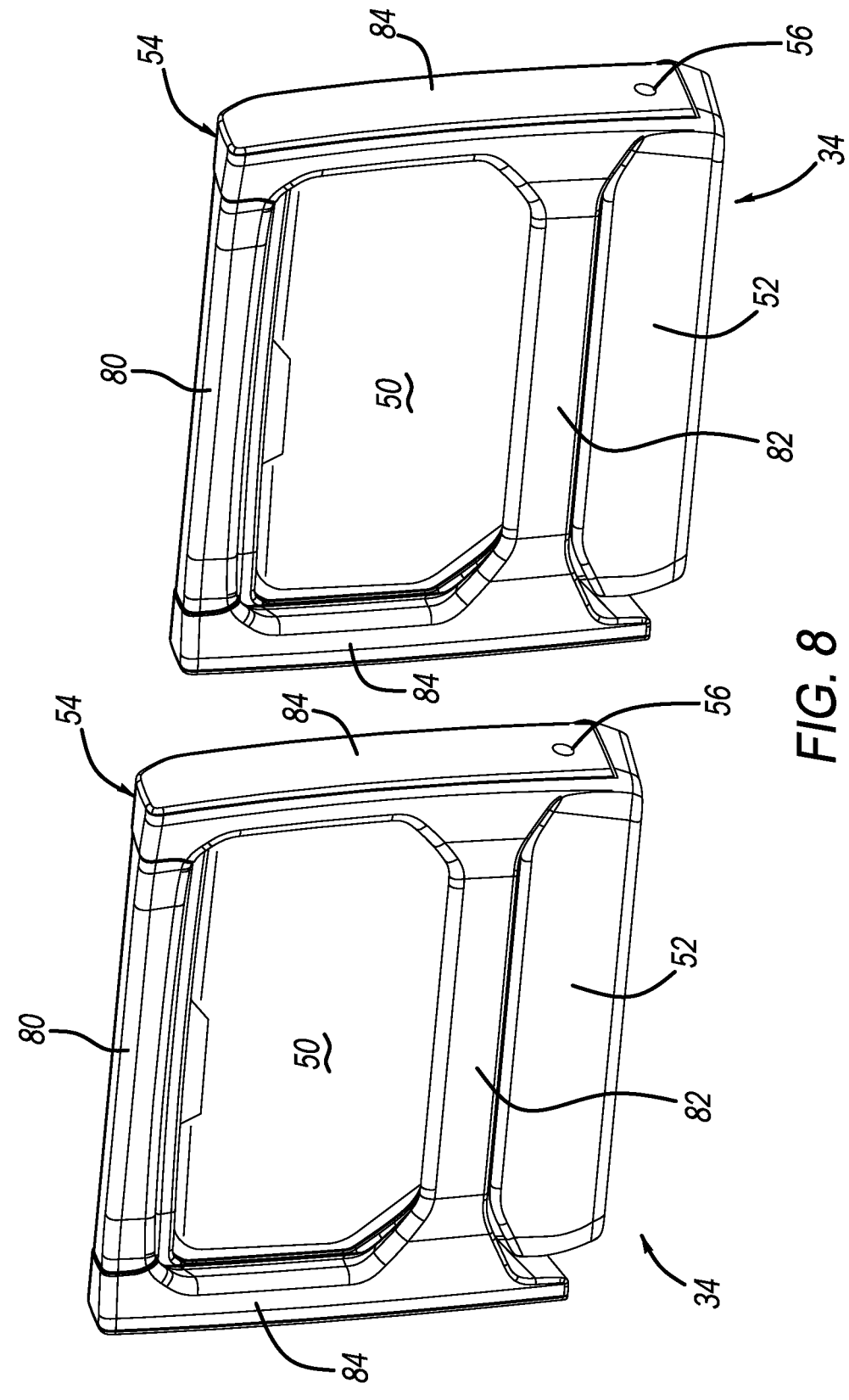
FIG. 8 is a perspective view of a jump seat removed from the rear wall and in a non-deployed position according to a principle of the present disclosure.
Figure 9:
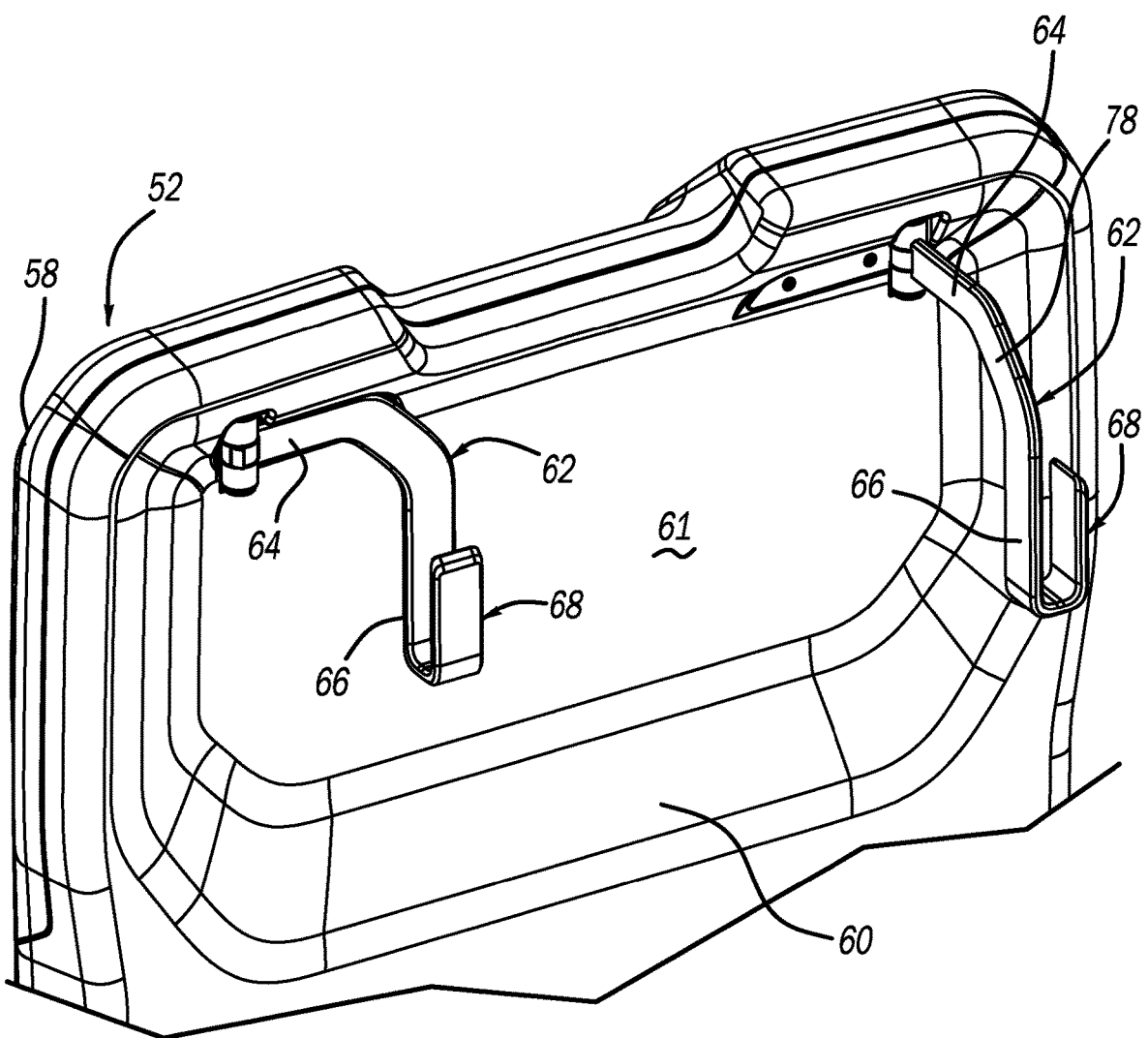
FIG. 9 is a perspective of a bottom of a jump seat, and illustrating a pair of movable arms attached thereto according to a principle of the present disclosure.

Now referring to FIGS. 7-9 and with continued reference to FIGS. 4-6, jump seats 34 include a seat back 50 that, when attached to recess 46 of lower section 42 and jump seat 34 is in the deployed position 34*b*, is configured as a lower backrest for a passenger sitting in the jump seat 34. Jump seat 34 also includes seat 52 that is pivotable relative to seat back 50 between the non-deployed position 34*a* and deployed position 34*b*. In this regard, seat 52 is attached to a frame 54 of jump seat 34 using a pivot pin 56. Pivot pin 56 maybe spring-loaded to bias seat 52 back to the non-deployed position 34*a*.

Seat 52 includes a top surface 58 that, when jump seat 34 is in the deployed position 34*b*, is configured to be sat upon by a passenger of vehicle 10. Seat 52 also includes a bottom surface 60 that, when jump seat 34 is in the non-deployed position 34*a*, faces second row of passenger seats 30. As best shown in FIGS. 8 and 9, bottom surface 60 includes a recessed section 61 having a pair of multi-function arms 62 that are movable relative to bottom surface 60.

Arms 62 may be formed of a rigid material such as a metal material (e.g., steel, aluminum, and the like) and include a first or proximate end 64 that is pivotably attached to bottom surface 60 and a second or distal end 66 that defines a hook 68. Because arms 62 are pivotably attached to bottom surface 60, arms 62 may be moved between a first position where arms 62 abut or are located close to bottom surface 60 and a second position where arms 62 extend outward from bottom surface 60 (see, e.g., FIGS. 4, 6, 7, and 9). A depth D of recessed section 61 is sufficient such that arms 62, when in the first position (see, e.g., FIGS. 4 and 9) where arms 62 are in abutment with or positioned closely to bottom surface 60, do not obstruct jump seat 34 from being able to rest upon a flat surface when removed from rear wall 26 (see, e.g., FIG. 12). In addition, when jump seat 34 is nested with recess 46 of rear wall 26, hooks 68 are configured to face second row of seats 30. When hooks 68 face second row of seats 30, the hooks 68 are in a position that enables one to hang items (e.g., grocery bags, etc.) therefrom. It should be understood, however, that even when arms 62 are pivoted to extend outward from bottom surface 60, one is still able to hang items from hooks 68. Thus, in addition to providing increased seating for vehicle 10, jump seats 34 including multi-function arms 62 are also configured to enhance the storage capability of vehicle 10.

In addition to first end 64 that is pivotably attached to bottom surface 60 and second end 66 that defines hook 68, it should be understood that arms 62 include a curved section 78 that connects first end 64 and second end 66. When arms 62 are pivoted away from bottom surface 60 (see, e.g., FIG. 7) such that arms 62 extend outward from bottom surface 60, curved section 78 defines a clearance C between bottom surface 60 and second end 66, which will be described in more detail later and provides an additional function for arms 62.

As best shown in FIGS. 4-8, frame 54 may be formed of a rigid material such as a metal material (e.g., steel, aluminum, and the like) or a rigid polymeric material (e.g., polyamide, polystyrene, or any other rigid polymeric materials know to those skilled in the art), and is configured to support seat back 50, seat 52, and the mass of a person sitting in jump seat 34 whether attached to rear wall 26 or when jump seat 34 is removed from rear wall 26. Frame 54 maybe a monolithic member including a laterally extending upper bar 80, a laterally extending lower bar 82, and a pair of vertically extending side bars 84 that extend between upper bar 80 and lower bar 82. Frame 54 may be hollow or frame 54 may be a non-hollow structure.

Figure 10:
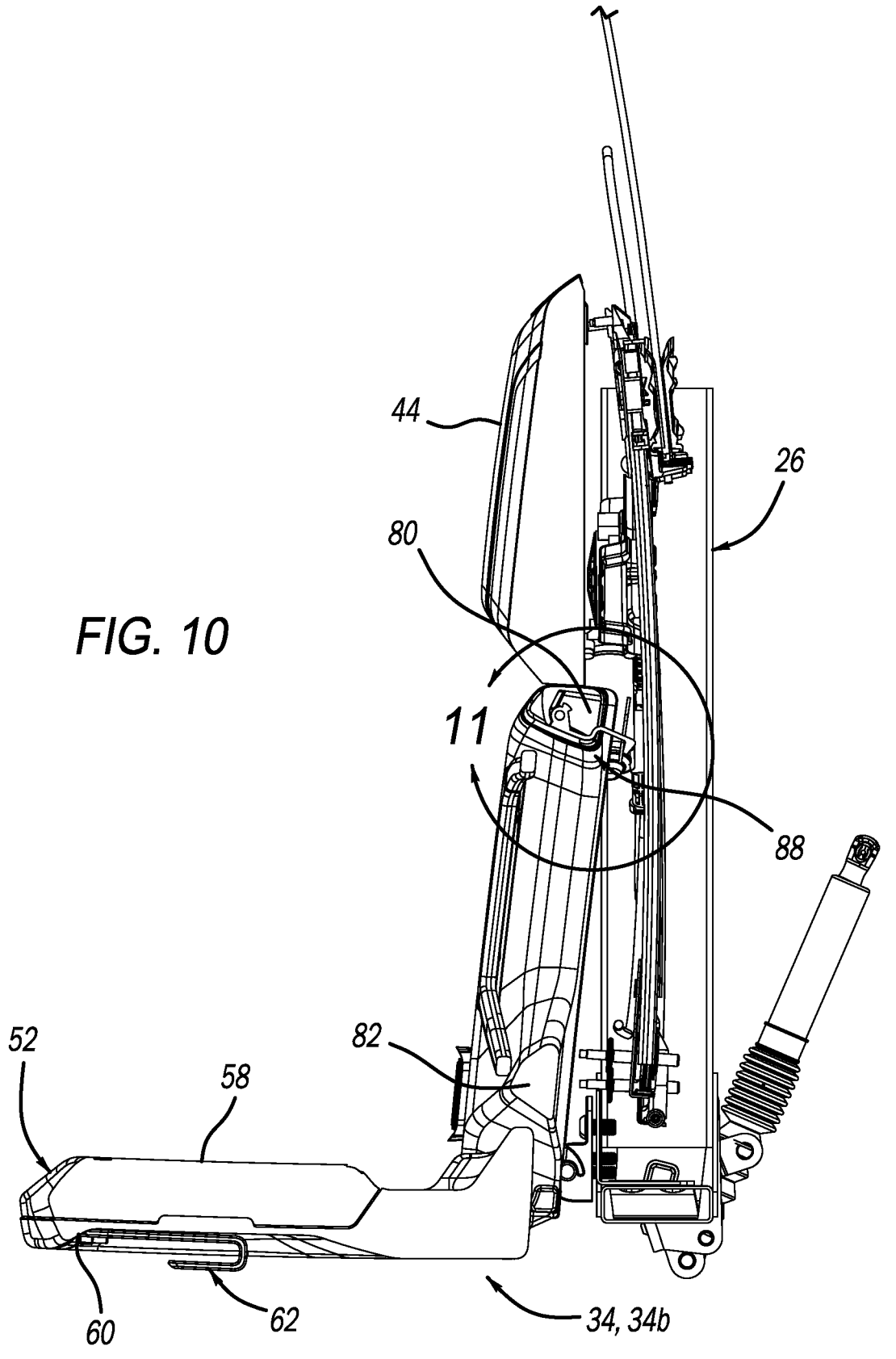
FIG. 10 is a cross-sectional view of the rear wall and the jump seat in a deployed position according to a principle of the present disclosure.
Figure 11:
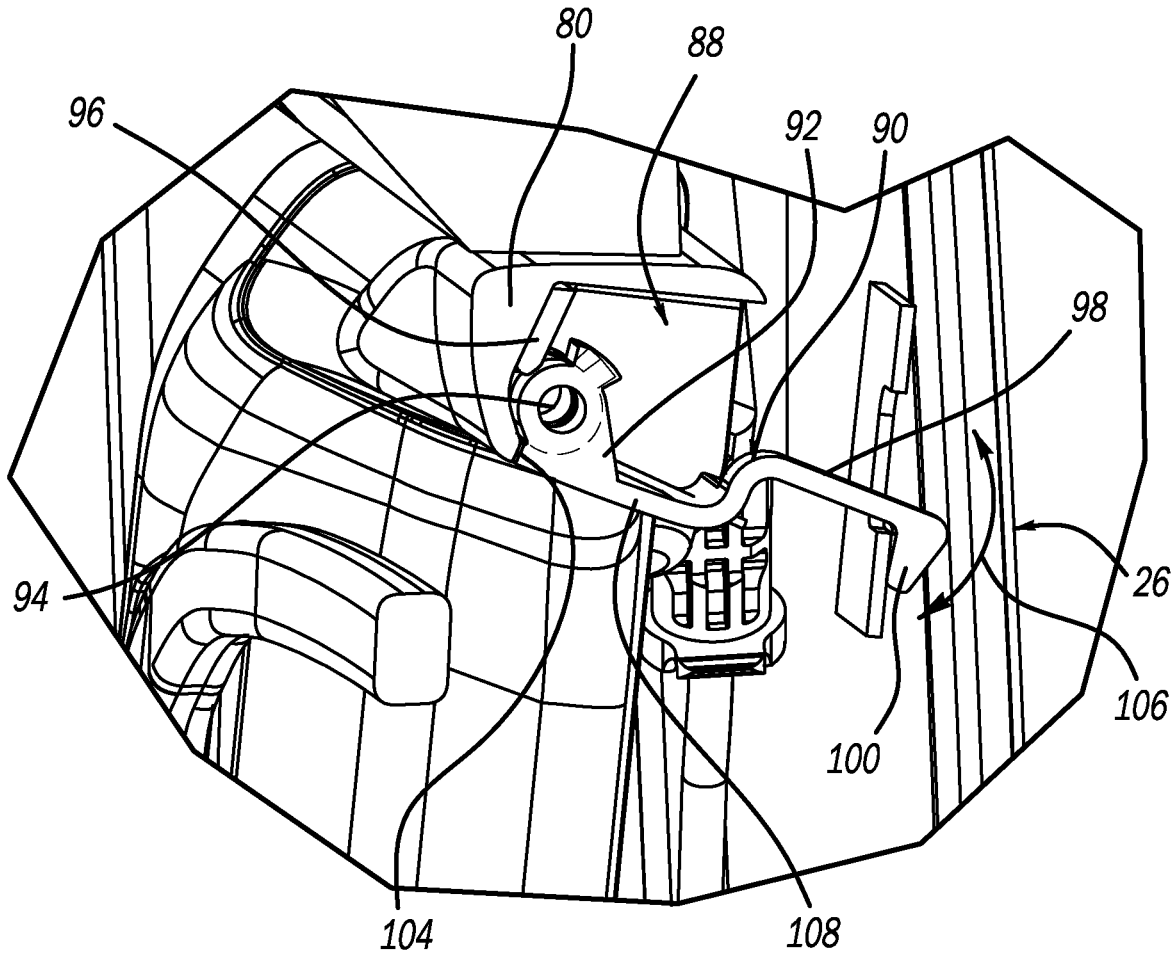
FIG. 11 is an enlarged cross-sectional view of a connection between the jump seat and the rear wall shown in FIG. 10 according to a principle of the present disclosure.

Upper bar 80 of frame 54 may function as a handle 84 to grasp when jump seat 34 has been detached from rear wall 26 so that jump seat 34 can easily be moved from place to place and used as a seat (see, e.g., FIGS. 10 and 11). Handle 84 may be defined by a recessed section 86 that provides improved ergonomics when grasped.

Upper bar 80 also includes a detachment mechanism 88 that can be actuated to detach jump seat 34 from rear wall 26. Detachment mechanism 88 is a movable lever 90 having a proximate end 92 pivotably attached to a spring-biased pivot pin 94 attached to a bracket 96 provided within upper bar 80/handle 84 of frame 54. Lever 90 also includes a distal end 98 that defines a latching device 100 that is configured to mate with an aperture 102 (as best shown in FIG. 6) formed in recess 46 of rear wall 26. Lever 90 is preferably formed from, for example, rigid material such as a metal material or a rigid polymeric material to assist in supporting the mass of an occupant that is sitting in jump seat 34 when jump seat 34 is attached to rear wall 26.

To actuate lever 90, upper bar 80 includes an opening 104 that enables an occupant of vehicle 10 to manipulate (i.e., pivot) lever 90 using their fingers such that lever 90 can pivot in the directions shown by double-headed arrow 106. That is, opening 104 exposes a manipulation section 108 located at distal end 98 that may be contacted by an occupant's fingers to lift latching device 100 away from engagement with aperture 102 and then pull on upper bar 80/handle 84 in a direction away from rear wall 26 to remove jump seat 34 from rear wall 26.

Once jump seat(s) 34 are removed from rear wall 26, jump seats 34 can be used in a variety of ways. For example, as shown in FIG. 12, jump seats 34 can be removed from vehicle 10 and opened to the deployed position 34*b* for use as a seat. In FIG. 12, jump seats 34 are located upon tailgate 17 of vehicle 10. In the illustrated embodiment, it should be understood that multi-function arms 62 are pivoted toward bottom surface 60 of seat 52 so that multi-function arms 62 do not obstruct jump seat 34 from resting comfortably upon tailgate 17. While jump seats 34 are illustrated as being used as a seat upon tailgate 17, jump seat(s) 34 may be used on any flat surface.

Figure 13:
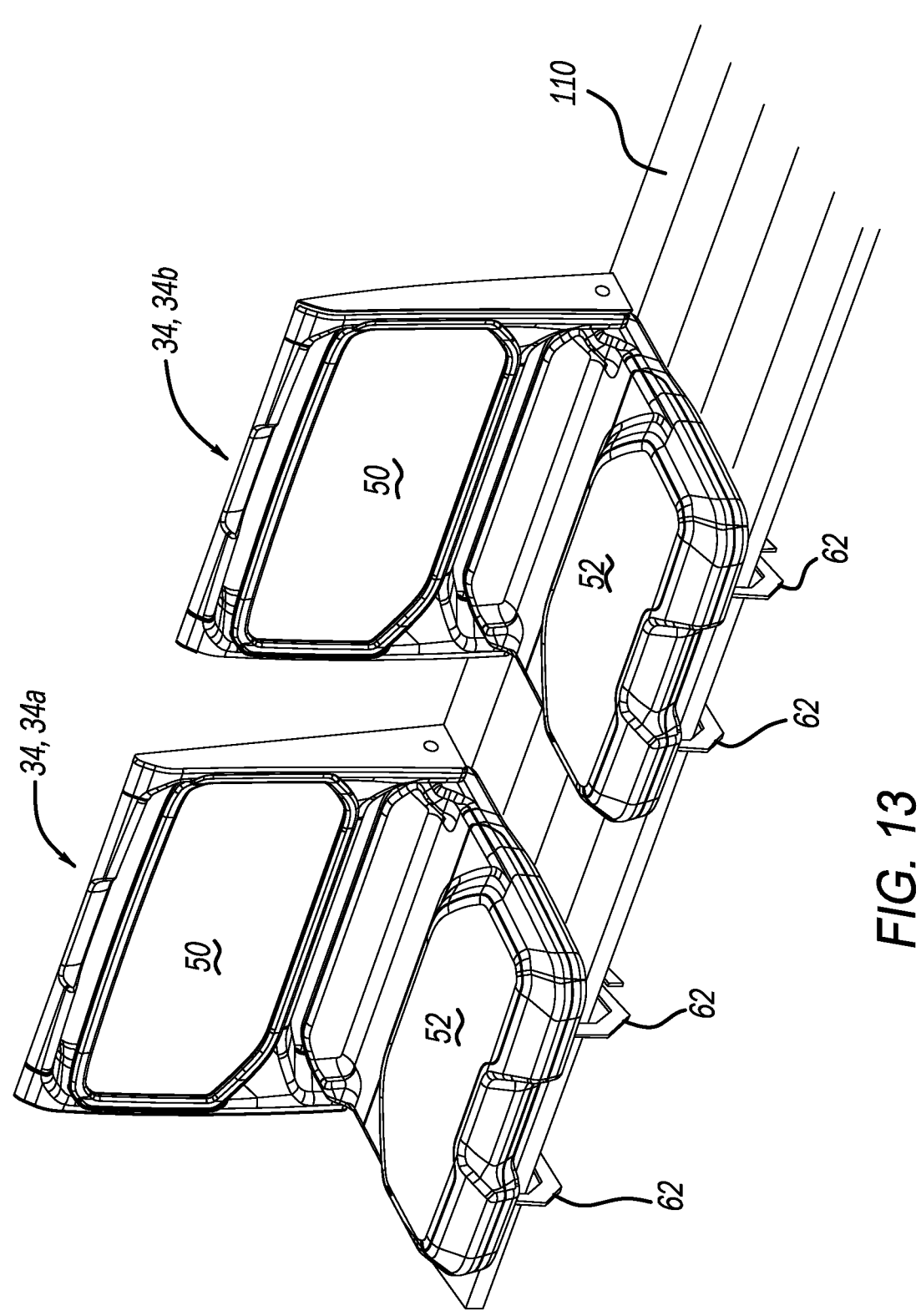
FIG. 13 is a perspective view of a jump seat attached to a bleacher seat according to a principle of the present disclosure.

As shown in FIG. 13, however, it should be understood that multi-function arms 62 may be pivoted away from bottom surface 60 and used to support jump seat(s) 34 when jump seat(s) 34 are used as a seat upon, for example, a bleacher or picnic table seat 110. As noted above, when multi-function arms 62 are pivoted away from bottom surface 60 of seat 52, a clearance C is provided between bottom surface 60 and second end 66. This clearance C may be sized to accommodate the bleacher or picnic table seat 110 between bottom surface 60 and second end 66 such that when jump seat(s) 34 are attached to bleacher or picnic table seat 110, an occupant of jump seat 34 may lean back against seat back 50 without fear of jump seat 34 rotating backwards. Thus, in addition to providing increased storage capability when jump seat(s) 34 are attached to rear wall 26 of vehicle, multi-function arms 62 provide increased functionality to jump seat(s) 34 when jump seat(s) 34 are removed from vehicle 10.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle comprising:

a vehicle body defining a passenger cabin having at least one row of passenger seats, and a storage region located between the at least one row of seats and a rear wall of the passenger cabin; and at least one jump seat, wherein the at least one jump seat includes:

a frame configured to be attached to and detached from the rear wall of the passenger cabin;

a seat back attached to the frame;

a seat pivotally attached to the frame such that the jump seat is configured to move between a deployed position where the seat is configured to support a passenger of the vehicle and a non-deployed position where the seat is oriented in parallel with each of the rear wall of the passenger cabin and the seat back; and a detachment mechanism attached to the frame and configured to be actuated to detach the at least one jump seat from the rear wall of the passenger cabin.

2. The vehicle according to claim 1, wherein the seat includes an upper surface that is configured to support the passenger when the jump seat is in the deployed position and a bottom surface, the bottom surface including a pair of multi-function arms pivotally attached thereto.

3. The vehicle according to claim 1, wherein each of the multi-function arms includes a proximate end pivotally attached to the bottom surface and a distal end that defines a hook, and wherein each the multi-function arms is movable between a first position where the distal end that defines the hook of each of the multi-function arms is positioned adjacent to the bottom surface and a second position where the distal end that defines the hook of each of the multi-function arms is located distal to the bottom surface.

4. The vehicle according to claim 3, wherein each of the multi-function arms includes a curved section between the proximate end and the distal end that defines a clearance between the bottom surface and the distal end that defines the hook when each of the multi-function arms are in the second position, the clearance being configured for receipt of a member to which the at least one jump seat may be attached when the at least one jump seat is detached from the rear wall of the passenger cabin.

5. The vehicle according to claim 1, wherein the rear wall of the passenger cabin includes an upper section having a cushioned seat back, and the cushioned seat back is located above the seat back of the jump seat when the jump seat is attached to the rear wall of the passenger cabin.

6. The vehicle according to claim 1, wherein the rear wall includes a lower section positioned beneath the upper section that includes at least one recess configured for receipt of the frame such that the at least one jump seat nests with the recess when attached to the rear wall of the passenger cabin.

7. The vehicle according to claim 6, wherein the detachment mechanism includes a lever including a proximate end pivotably attached to the frame and a distal end defining a latching device that mates with an aperture formed in the rear wall.

8. The vehicle according to claim 7, wherein the frame defines a graspable handle, and the detachment mechanism is located proximate the graspable handle.

9. The vehicle according to claim 8, wherein the graspable handle includes an opening that exposes a manipulation section of the lever, and enables the manipulation section to be contacted to actuate the lever.

* * * * *